United States Patent Office 3,312,683
Patented Apr. 4, 1967

3,312,683
PROCESS FOR PRODUCING DERIVATIVES OF
D-GLUCOSE
Walter Gerald Farkas, Upper Montclair, and Frederick H. Hemsley, North Arlington, N.J., assignors to Hoffmann-La Roche Inc., Nutley, N.J., a corporation of New Jersey
No Drawing. Filed June 9, 1964, Ser. No. 373,833
6 Claims. (Cl. 260—209)

The invention relates to a process for the manufacture of 2-deoxy-D-ribose. Specifically, it relates to an improvement in that step of the method for synthesizing 2-deoxy-D-ribose in which D-glucose is subjected to the action of a strong alkali. The reaction product obtained in such step is subsequently converted via the well-known Ruff degradation to 2-deoxy-D-ribose anilide which is in turn converted to the 2-deoxy-D-ribose product, i.e., 2-deoxy-D-erythro-pentose.

2-deoxy-D-ribose is the carbohydrate constituent of deoxyribonucleic acids found in the cells of animals, plants and bacteria and is, therefore, of considerable biochemical importance. In recent years, it has become of even greater importance as a starting material for synthetic work, particularly in the synthesis of deoxyribonucleic acids and in the preparation of anti-metabolites such as FUDR (5-fluoro-2'-deoxyuridine) which have also become of great importance only recently. For this reason, there has been an increasing demand for this hitherto rare sugar requiring a suitable process for the commercial synthesis of 2-deoxy-D-ribose.

It is, therefore, an object of this invention to provide an effective commercially acceptable process for the synthetic production of 2-deoxy-D-ribose utilizing readily available and inexpensive starting materials without the need for costly plant equipment or cumbersome recovery techniques.

2-deoxy-D-ribose has previously been prepared by the treatment of D-glucose with a large excess of sodium hydroxide in aqueous solution at an elevated temperature. The mixture of D-glucometasaccharinic acids which results is suitable for conversion via the Ruff degradation to the desired 2-deoxy-D-ribose product. In another process, 2-deoxy-D-ribose has been prepared on a laboratory scale by a somewhat similar method in which dry D-glucose monohydrate is isomerized by heating with dry powdered calcium hydroxide to a mixture containing the calcium salts of D-glucometasaccharinic acids. This mixture can be submitted without isolation to the Ruff degradation. The crude 2-deoxy-D-ribose, thus formed, is isolated as its anilide, which may be easily converted to the free sugar by cleavage with benzaldehyde.

Both of these processes suffer serious drawbacks when attempts are made at commercial application. In the first case, the quantity of aqueous sodium hydroxide used in the reaction presents difficulties in that large volumes of water must be removed from the reaction mixture in order to recover the product. An even greater problem is the removal of the sodium salt which forms upon neutralization following completion of the reaction. The water-soluble sodium salts can be removed only by tedious and repeated filtrations. All of these operations are very cumbersome, requiring extensive equipment and manpower which render the sodium hydroxide process undesirable as a commercial process. The process of isomerizing dry D-glucose by heating with dry calcium hydroxide, on the other hand, presents a distinct advantage over the aqueous sodium hydroxide procedure since the reaction mixture, after completion of the reaction, can be suspended in water and the bulk of the only sparingly soluble calcium salts can be easily removed by filtration. The major disadvantage of this process is that while it is possible on a laboratory scale, it cannot be adapted to commercial production due to the almost unmanageable violence of the reaction. Thus, when an intimate mixture of dry glucose and dry calcium hydroxide are heated to about 120° C., there is a sudden onset of the reaction which is accompanied by a liberation of very large volumes of water making the reaction practically unworkable on anything but a laboratory scale. These disadvantages have now been overcome by the present invention which provides a commercially feasible process for the manufacture of 2-deoxy-D-ribose.

The process of the present invention comprises heating D-glucose with a very sparingly water soluble base in a suitable reaction medium to produce inter alia a mixture of 3-deoxy-D-ribo and 3-deoxy-D-arabino hexonic acids (D-glucometasaccharinic acids). A Ruff degradation of the 3-deoxyhexonic acids, using hydrogen peroxide in the presence of ferric acetate, yields 2-deoxy-D-ribose which can then be isolated as the rather insoluble anilide. The 2-deoxy-D-ribose anilide is easily converted to the 2-deoxy-D-ribose product by splitting off the anilide in benzaldehyde.

The essential novelty of this process consists of the finding that the first step, i.e., the conversion of D-glucose to 3-deoxyhexonic acids by the action of heat and alkali, can be conveniently carried out on a plant scale by modifying it into a less violent reaction which can be safely handled in commercial production. This is accomplished in the instant process by carrying out the reaction in a suitable reaction medium. It has been discovered, surprisingly, that the use of certain inert organic solvents as reaction media enables the isomerization reaction to be carried out under less hazardous conditions by initiating the reaction at a lower temperature thereby spreading it over a longer time period and at the same time removing the water liberated in the reaction by azeotropic distillation. Accordingly, the organic solvents which can be suitably used as reaction media in the practice of this invention are those which form azeotropes with water. Appropriate water-azeotrope formers are those inert organic solvents which form minimum constant boiling mixtures with water and preferably those which will cause the reaction to be initiated at a temperature which is below the boiling point of the azeotrope that forms.

Thus, the instant invention provides a process by which the conversion of D-glucose is carried out in a water-azeotrope former which is inert to the reactants and to the products of the reaction under the conditions employed. By this means, it has been found possible to provide a commercially feasible process for producing 2-deoxy-D-ribose without the hazardous conditions which go with the reaction of dry D-glucose and dry calcium hydroxide or the cumbersome working up required to recover the product when D-glucose is treated with aqueous sodium hydroxide.

More particularly, the process of this invention comprises converting D-glucose to 2-deoxy-D-ribose by the following steps.

In the first step of the process, D-glucose is slurried with a very sparingly water soluble base in a suitable inert organic solvent. The slurry is heated until the reaction begins. The temperature is then raised to the boiling point of the water azeotrope which forms. Thereafter, the temperature is maintained constant until completion of the reaction. The water of the reaction is continuously removed by azeotropic distillation as the reaction progresses. After completion of the reaction, the temperature is raised to the boiling point of the organic solvent in order to remove any residual water. The mixture is then cooled to room temperature and filtered. Any suitable filter aid such as an infusorial earth may be used in filtering. The reaction product, consisting of 3-deoxyhexonic acids, is extracted with water at the boiling point. The aqueous phase is treated with carbon dioxide until the pH is less than 7 and then filtered. The filtrate so-obtained can be submitted without further purification of the Ruff degradation which constitutes the second step of the process.

It will be readily appreciated that the reaction temperature for the conversion of D-glucose described above can vary over a wide range depending upon the choice of solvent. It is preferred, however, to carry out the reaction at an elevated temperature. A suitable temperature for carrying out the reaction is the boiling point of the azeotropic mixture which forms. Accordingly, a preferred temperature range for carrying out the reaction in the first step of this process is the temperature range corresponding to the boiling points of the preferred solvents and their water-azeotropes. An especially preferred temperature range is from about 70° to about 100° C.

A suitable reaction medium for use in the first step of the process of this invention is any organic solvent which will form an azeotrope with water. Preferred solvents are those which form minimum constant boiling mixtures with water such that the boiling point of the azeotrope is, in each instance, slightly higher than the temperature at which the reaction of the D-glucose is initiated. While not essential to the reaction, it is desirable that the boiling point of the azeotrope be higher than the temperature at which the reaction is initiated in order that the water which forms in the reaction can be easily and rapidly removed from the reaction by azeoptropic distillation. Suitable inert organic solvents for use in the process of this invention are those inert organic solvents which form azeotropic mixtures with water such that the boiling point of the azeotrope is within the range of about 70° C. to about 100° C. Representative solvents in this category are toluene, benzene, butanol and octyl alcohol. The preferred solvent for use in the practice of the instant process is toluene which has been found to be an almost ideal reaction medium. Thus, when the reaction is carried out in toluene, it has been found that the reaction is initiated at the relatively low temperature of 70–80° rather than at 115–120°, as is the case in the dry reaction. Additionally, the water liberated in the reaction is removed as an azeotropic mixture which distills over at a temperature of about 80–85° C. which is slightly higher than the temperature at which the reaction is initiated in this instance.

The D-glucose starting material used in this process is a readily available and relatively inexpensive product of commerce. The pure form of this substance, sold as U.S.P. Dextrose, may be used. A less pure form of dextrose may also be used. A slightly less pure and much less expensive form of α-D-glucose monohydrate marketed under the name Cerelose is wholly satisfactory. In the selection of a strong base for carrying out the conversion of D-glucose to D-glucometasaccharinic acids, it has been found convenient to employ a very sparingly water soluble base in order to permit easy recovery of the product. The water-soluble D-glucometasaccharinic acids and their salts can be easily separated in an aqueous system by filtration or by hot water extraction from the excess base or its salts. The isomerization of D-glucose to 3-deoxyhexonic acids is not, however, dependent upon the use of a sparingly water soluble base. The reaction per se could be effected by any strong alkali though a base which is only sparingly soluble in water is preferred in order to facilitate recovery of the product. Suitable bases are the alkaline earth metal hydroxides, particularly calcium hydroxide which is readily available and inexpensive. Furthermore, the salts of calcium hydroxide, e.g., calcium carbonate, which are formed in the process, are also only sparingly soluble in water and therefore easily removed.

In an alternative procedure, step 1 of the process of this invention can be carried out by adding the D-glucose starting material in increments to a slurry of calcium hydroxide and toluene. The calcium hydroxide-toluene slurry is heated to about the reaction temperature or slightly above. In the case of toluene this is about 70° C. as has been indicated heretofore. In the case of other solvents, the reaction temperature can be determined experimentally in advance of the production run. The dry D-glucose is then added in small portions at intervals of about 5 to 10 minutes. By the slow addition of D-glucose in this way, it is possible to reduce the intensity of the reaction to an even greater extent. After the initial addition of D-glucose, the temperature of the slurry is raised to about 90° C. and maintained at that temperature throughout subsequent additions of D-glucose thereby permitting the water-toluene azeotropic mixture to be continuously removed by distillation. After all of the D-glucose has been added, the slurry is held at the reflux temperature of the toluene till all residual water is removed. The slurry is then cooled and filtered. The cake is dried, extracted with hot water and acidified with carbon dioxide to remove some of the dissolved calcium as the carbonate. The filtrate can then be submitted to the Ruff degradation according to the second step of the process of this invention.

The second step of the process involves converting the D-glucometasaccharinic acid product of step one by means of the Ruff degradation to the anilide of 2-deoxy-D-ribose. The Ruff degradation is a well-known method of shortening the carbon chain of a sugar by oxidizing the aldonic acid or its calcium salt with hydrogen peroxide in the presence of ferric salts. The degradation step is carried out as follows. To the filtrate from step one of the process is added a previously prepared mixture of ferric sulfate hydrate and barium acetate under stirring. Hydrogen peroxide is then added very carefully in portions, each successive portion being added only when the evolution of gas from the preceding addition has subsided. The reaction mixture is filtered, evaporated to a syrup and slurried in alcohol. The resulting deoxypentose is then isolated as its anilide by adding aniline to the reaction mixture with stirring. The mixture is then seeded and cooled. The 2-dexoy-D-ribose anilide which precipitates is filtered and washed.

In the third step of this process, the 2-deoxy-D-ribose anilide is converted to 2-deoxy-D-ribose by cleavage with benzaldehyde. This method, like the Ruff degradation of the second step, is not per se novel, but has been adapted for commercial scale production from a known laboratory procedure. The 2-deoxy-D-ribose anilide is mixed with benzaldehyde and benzoic acid in water. The mixture is shaken at room temperature and extracted with suitable solvents. Any inert solvent such as ether may be used. The aqueous phase is decolorized, filtered and concentrated to a syrup. Any suitable decolorizing material such as activated carbon can be used. The syrup is then dissolved in a suitable solvent, for example, a mixture of alcohol and acetone such as isopropanol-acetone. The solution is then seeded and cooled to precipitate the crystalline 2-deoxy-D-ribose. The crystalline mass may be washed in an inert solvent such as an alcohol-acetone mixture or absolute ether.

The following examples illustrate the process of this invention but are not to be construed as limitative thereof. All temperatures are in degrees centigrade and all melting points are corrected.

EXAMPLE 1

In a 3-liter, 3-neck flask (equipped with stirrer, condenser and receiver), a slurry of 330 g. (1.65 moles) of α-D-glucose monohydrate, a commercially available product which is produced by the Corn Products Refining Co. of Argo, Ill., and marketed under the name of "Cerelose," and 309 g. (4.05 moles) of calcium hydroxide in 1200 ml. of toluene were slowly heated under a nitrogen stream to a temperature of 70–80°. A yellow to brown color change occurred at about 80–85°, where-upon a copious evolution of water occurred which was distilled out as the toluene-water azeotrope. Following the vigorous boiling, the slurry was heated to the toluene boiling point and held there till no further water distilled over. The batch was cooled to room temperature and filtered in vacuo. The cake was dried in vacuo to remove all of the toluene prior to extraction with water in order to avoid foaming. The cake was then extracted by agitation with 1500 ml. of water at the boiling point. The extract was cooled to about 80° and filtered through filter aid. An infusorial earth marketed under the name "Celite" was used. The aqueous phase was treated with carbon dioxide (Dry Ice) until the pH was less than 7. The Dry Ice (or $CO_2$) was added gradually to avoid excessive foaming. The solution was then slowly heated to boiling for 15 minutes, filtered and placed in a 5-liter, 3-neck flask for the Ruff degradation.

*Ruff degradation.*—A previously ground mixture of 15 g. (0.026 mole) of ferric sulfate hydrate and 24 g. (0.095 mole) of barium acetate was added with stirring and warming to about 37°. Six additions of 30 percent hydrogen peroxide in portions of 50 ml. each (total of 300 ml. equaling 2.65 moles of $H_2O_2$) were *very carefully* made. The temperature of the oxidation was maintained between 40–45°. Each successive portion was added only when the evolution of gas from the preceding addition had subsided. The oxidation mixture was then treated with 50 g. of activated carbon (Norit). The mixture was filtered through Celite and evaporated in vacuo at 30–32° maximum to a heavy syrup. The residual syrup was slurried with 1250 ml. of methanol until well broken up. 50 grams of Norit were again added, the batch filtered through Celite, and concentrated in vacuo at 30–32° to a volume of 250 ml. 100 milliliters of water 35 ml. (0.384 mole) of aniline were added with stirring and the mixture was seeded and cooled at 0–5°. When crystallization was completed, the precipitate was filtered and washed successively with two 40 ml. portions of methanol-water 1:1 (v./v.), two 40 ml. portions of ethyl acetate (cold), one 40 ml. portion of methanol (cold) and finally with two 50 ml. portions of petroleum ether.

The cake was dried in vacuo at room temperature. The 2-deoxyribose anilide melted at 161–162°.

EXAMPLE 2

This example illustrates the alternate procedure wherein the D-glucose starting material is added to the reaction mixture in successive portions.

309 grams of calcium hydroxide were slurried and heated in 900 ml. of toluene to a temperature of 80°. Then 82.5 g. of Cerelose (dry) were added, and the temperature was raised to 89°. A gentle distillation of the water-toluene azetrope, which had formed, resulted, and another addition of 82.5 g. of Cerelose (dry) was made after about 7 minutes. Two more additions of 82.5 g. of Cerelose (dry) were made in about 7 minute intervals so that a total of 330 g. of Cerelose (dry) were reacted. Water-toluene was continuously removed by azeotropic distillation and the slurry was finally held at the reflux temperature of toluene, i.e., at about 110° for a short period. The slurry was then cooled and the solids were filtered off and dried. The dry cake was extracted by slurrying in 1500 ml. of boiling water, the slurry was cooled to 75° and the solids were filtered off.

Further treatment was identical to the procedure as described in Example 1. The 2-deoxyribose anilide obtained in this process melted at 164–165°.

This procedure offers the additional advantage that smaller portions of toluene can be used and is, therefore, particularly well suited for the large-scale manufacture of 2-deoxyribose anilide.

EXAMPLE 3

This example represents a pilot plant run which illustrates the commercial adaptability of the process.

A 50 gal. (g./l.) kettle was charged with 16.5 kg. (82.5 moles) of Cerelose (36.30 lb.) and 15.45 kg. (202.5 moles) of calcium hydroxide (34.00 lb.) in 60.00 liter of toluene (15.00 gal.) and heated with hot water and agitation under a nitrogen stream. At a temperature of about 80°, the slurry turned thick brown, followed by the rapid evolution of water-toluene as an azeotrope which was distilled off. The kettle was then heated with steam to the toluene boiling point (110°). When water ceased to distill over, the batch was cooled to room temperature, filtered on a large ceramic filter and dried in vacuo at 30° with nitrogen bleed. The solid was extracted in a 30 gal. (g./l.) kettle with 75 liter of demineralized water (20 gal.) at the boiling point for 15 minutes and filtered through Celite on a large ceramic filter. The aqueous filtrate was charged to a 50 gal. (g./l.) kettle and treated with pulverized Dry Ice to pH of 6.8. The batch was then heated slowly to the reflux temperature for 10–15 minutes, cooled to 60° and filtered on a large ceramic filter. The aqueous filtrate was charged to a 50 gal. (g./l.) cooled kettle for the Ruff degradation.

A preground mixture of 50 g. (1.30 moles) of ferric sulfate hydrate and 200 g. (4.75 moles) of barium acetate were added to the vigorously stirring solution. Twenty additions of 500 ml. each of hydrogen peroxide (35 percent) were very carefully made at ten minute intervals (500 ml./10 minutes), maintaining the temperature at 40–45°. Each addition was made after gas evolution, resulting from the previous addition, had subsided. Following the 10 liters of oxidant, (i.e., 20 x 500 ml. of hydrogen peroxide) another five portions of 1000 ml. each of hydrogen peroxide were more quickly added, still maintaining the 40–45° pot temperature. The 15-liter (132.5 moles) addition of oxidant required a total of five hours to complete. After the evolution of gas subsided, the batch was cooled to 0–5°. The batch was then treated with 300 g. of Norit, filtered over Celite on a large ceramic filter and concentrated in vacuo at 30–32° to approximately 5 gals. 20 gallons of methanol were added and the slurry agitated until uniformly broken up. The slurry was then treated with 300 g. of Norit, filtered (pressure) through a stainless steel pressure filter into 5-gal. bottles. The methanol solution was concentrated at 30–32° to 3–4 gal., diluted with 2 liters of water and treated with 1800 ml. (19.8 moles) of aniline with shaking in a 5-gal. bottle. Seeded with 2-deoxyribose anilide, the batch was cooled to about 0–5° until precipitation of the 2-deoxy-D-ribose anilide was completed.

The product was filtered and washed successively with two 2000 ml. portions of methanol-water 1:1 (v./v.), 2000 ml. of ethyl acetate (cold), 500 ml. of methanol (cold) and two 2000 ml. portions of petroleum ether and dried in vacuo at 30° with nitrogen bleed.

The procedure, as described, has been shown to be applicable in every respect to the large-scale manufacture of 2-deoxyribose anilide.

What is claimed is:

1. The process which comprises treating D-glucose with an alkaline earth metal hydroxide in the presence of as a liquid reaction medium an inert organic compound which forms a minimum boiling azeotrope with water boiling within the range of about 70° C. to about 100° C., said treatment being effected at an elevated temperature such that the water of reaction is continuously distilled from the reaction mixture as an azeotrope with said inert organic compound.

2. The process of claim 1 wherein said azeotrope former is toluene.

3. The process of claim 1 wherein said alkaline earth metal hydroxide is calcium hydroxide.

4. The process of claim 1 wherein said azeotrope former is toluene and said alkaline earth metal hydroxide is calcium hydroxide.

5. The process of claim 4 where, in a next succeeding step, the reaction product of claim 4 is treated with hydrogen peroxide in the presence of ferric acetate.

6. The process of claim 5 where, in a next succeeding step, the product of claim 5 is isolated from the reaction mixture as 2-deoxy-D-ribose anilide and thereafter converted to 2-deoxy-D-ribose by mixing the anilide with benzaldehyde and benzoic acid.

References Cited by the Examiner

UNITED STATES PATENTS 2,602,084   7/1952   Gaver et al. _____ 260—210

FOREIGN PATENTS 768,250   2/1957   Great Britain.

ELBERT L. ROBERTS, *Primary Examiner.*

LEWIS GOTTS, *Examiner.*

JOHNNIE R. BROWN, *Assistant Examiner.*